April 10, 1928.  K. ARNSTEIN  1,665,872

ASSEMBLAGE POINT DEVICE

Filed June 28, 1920  2 Sheets-Sheet 1

INVENTOR:
Karl Arnstein

April 10, 1928.
K. ARNSTEIN
1,665,872
ASSEMBLAGE POINT DEVICE
Filed June 28, 1920   2 Sheets-Sheet 2
Fig. 11.
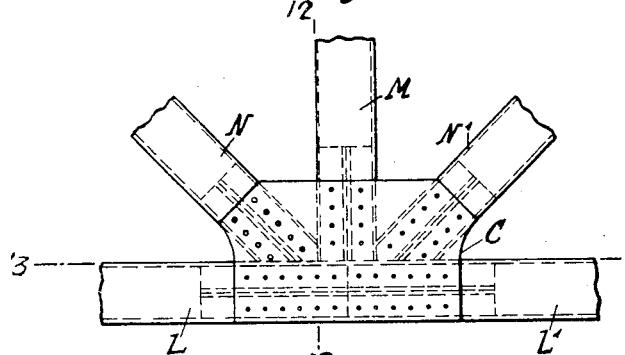
Fig. 12.
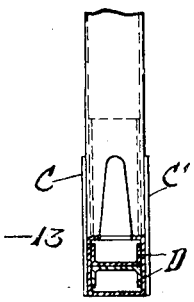
Fig. 13.
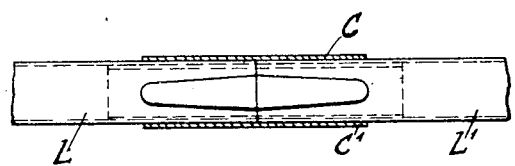
Fig. 14.   Fig. 15.
Fig. 16.
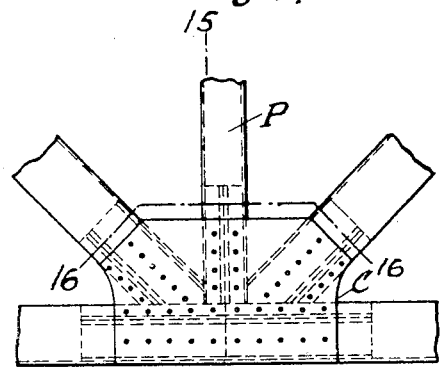
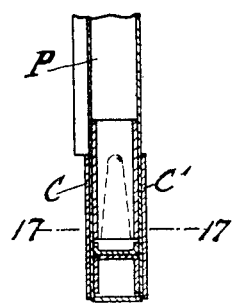
Fig. 17.
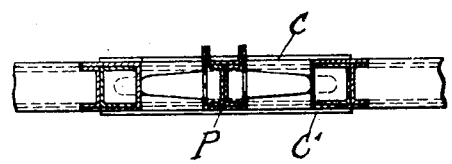
INVENTOR:
Karl Arnstein Patented Apr. 10, 1928.

1,665,872

UNITED STATES PATENT OFFICE.

KARL ARNSTEIN, OF FRIEDRICHSHAFEN, GERMANY, ASSIGNOR TO THE FIRM LUFT-SCHIFFBAU, ZEPPELIN GESELLSCHAFT MIT BESCHRANKTER HAFTUNG, OF FRIED-RICHSHAFEN, GERMANY.

ASSEMBLAGE-POINT DEVICE.

Application filed June 28, 1920, Serial No. 392,483, and in Germany October 13, 1917.

(GRANTED UNDER THE PROVISIONS OF THE ACT OF MARCH 3, 1921, 41 STAT. L., 1313.)

My invention refers to hollow sectional bars used for light structures, and more especially to assemblage point connections between closed sections thereof.

Though the advantage of using thin-walled closed hollow bars consisting of high quality material for light structures has been recognized for some time, such structural parts have until now been used less than the less strong or, if equally resistive, heavier open sections. The reason for this lies in the fact that open sections with plane faces can far easier be united to form multiple assemblage points than the closed ones, as they are accessible from all sides and make good connections. In light structures and especially in the manufacture of flying machine frames the assemblage of frame works made by riveting on the individual bars are very important.

My invention intends combining the advantages of closed and open hollow bars by changing in an especially simple way the closed hollow sections at their ends into open sections of equal resistance but of far better accessibility. The object of my present invention thus consists in an assemblage point connection for closed sections of the kind mentioned above, in which with the ends of the bars—which are plane or are made plane—one or a plurality of U-shaped connecting pieces are connected directly or by means of separate connections. According to the invention the connecting pieces transmit the bar tensions to the gusset joint plates either by themselves or combined with the side faces of the bars joined with them.

The U-shaped connecting pieces—which in certain cases can be replaced by two V-pieces—are particularly suitable for transmitting the forces, as they are easily manufactured owing to their plane faces and further provide good connections for the gusset joint plates. Moreover they can be joined in a very simple manner with the plane faces of the closed section. The plane working faces fully warrant an even tension sustained by all rivets, as bad work in riveting or non-fitting rivet heads is absolutely impossible.

The connecting pieces can be closely applied to the faces of the sections from outside or inside. In the first-mentioned case a joint connection can be made at the ends of a continuous main boom as well as in its middle portion. In the end connections proper the connecting pieces can be elongated beyond the bar ends in outside and in inside connections.

The end connection is made especially suitable by enveloping the connecting pieces to their full length by the bar ends, whose free sides are cut out in a well known manner. This can always be done according to the invention, inasmuch as the connecting pieces on account of their peculiar arrangement transmit the whole force acting upon the sectional bar. Thus the outward shape of such an end is not altered and sufficient space is left for uniting many sections in one joint. The whole joint connection thus becomes very sturdy and light, as all elements to be united can be disposed close to the axis of the boom. Besides the riveting can be extended almost to the point where all axes intersect. The drawing illustrates some modifications of joint connections according to the present invention in a purely diagrammatic manner.

In the drawings

Figs. 1, 2, 5 and 8 are cross-sectional views through quadrangular tubes, representing four different modifications of the construction according to the present invention; Figs. 3 and 4 are elevation and plan views, respectively, corresponding to Fig. 2; Figs. 6 and 7 are similar views corresponding to Fig. 5; Figs. 9 and 10 are elevational and plan views respectively corresponding to Fig. 8.

Figs. 11–13 are side views and various cross sections of a plane assemblage point of an air craft car composed of homogeneous sectional bars.

Figs. 14–17 are side views and various cross sections of a plane assemblage point with different kinds of sectional bars and connections.

Figure 1:
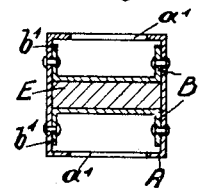
Figure 2:
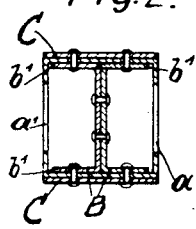
Figure 3:
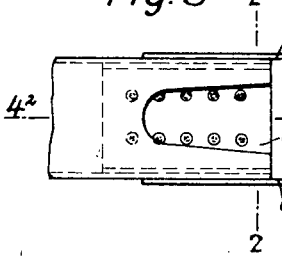
Figure 5:
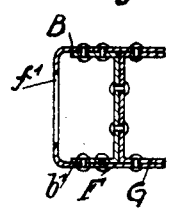
Figure 6:
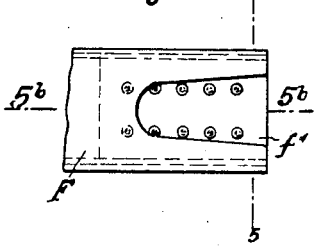
Figure 4:
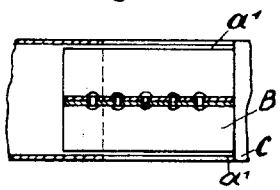
Figure 7:
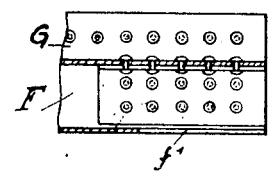

In the joint according to Fig. 1 two U-shape connection pieces B are connected with two opposite sides of a hollow bar A by their flanges $b^1$ so that between the webs facing each other a certain distance is left which, if required, may be filled by a filling piece E. To make riveting easier the free faces of the hollow bar mantle are cut out at their ends marked $a^1$. A similar construction is shown in Figs. 2, 3 and 4, but there the web faces of both sections B touch directly, so that the flanges $b^1$ riveted on to two sides of the end of the hollow bar A may be made wider. Fig. 2 shows how due to the cuts all of the remaining sides of the hollow bar connection butts C can be riveted on easily without making them wider than the height of the bar. The modification according to Figs. 5, 6 and 7 is based upon a hollow bar consisting of two open U bars F and G different in height. These are combined to a closed section with two outside flanges pointing in the same direction. On account of the inaccessibility of the closed hollow part the possibility of making connections is limited. This fault of the otherwise advantageous shape of the section can be removed according to the invention by inserting an U-shape connecting piece in the end of the hollow space, whose flanges $b^1$ are riveted on to the flanges of the wider U bar F and whose web is riveted on to the web of the narrower U bar G. By cutting away a portion of the wall at the end of the closed hollow member, as shown at $f^1$, the interior of the member is conveniently accessible for the purpose of fastening the elements to each other and to provide the desired joint.

Figure 8:
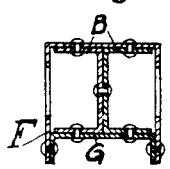
Figure 9:
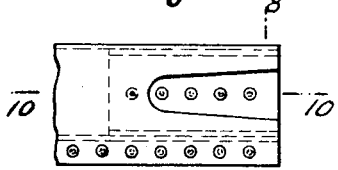
Figure 10:
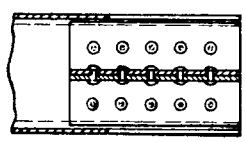

The joint according to Figs. 8, 9 and 10 differs from the last-mentioned substantially in the fact that in the interior of a hollow bar F G two U-shaped connecting pieces B are provided, whose webs touch one another and whose flanges are riveted on to the webs of bars F G. In this case the opposite walls of the end of the tube are both cut out so as to form two tapering or oppositely disposed spaced end portions projecting from the tube. The joint offers still more resistance than that according to Figs. 5, 6 and 7.

In the modification according to Figs. 11-13 two booms L and $L^1$ are united in a joint with a traverse bar M and two diagonal bars N and $N^1$ by means of two butt plates C and $C^1$. All the five hollow bars are made of the identical square section. The transmission of forces is done similarly to Figs. 2, 3 and 4 by inserting in each bar end two U-shape connecting pieces D riveted together by their webs. As the free sides of the bar ends not participating in the transmission of forces are cut out, the butt plates C can be riveted easily.

The otherwise similar joint according to Figs. 14-17 differs from the one just described mainly with regard to the somewhat different shape of the homogeneous sectional bars. All sections are composed of two U-bars of different height, which similar to Fig. 8 are united to a hollow bar possessing two parallel flanges. The transmission of forces to the butt plates C and $C^1$ is done similarly to the specimen construction in Figs. 8, 9 and 10, though the lower part of the flanges of the traverse bars P is cut off (Figs. 15 and 17) so as to allow the butt plate arranged in front to be directly riveted on to the web of the narrow part of bar P.

As the described joints show, the connections are absolutely reliable in spite of their simplicity, as the forces transmitted by the branches are taken up centrally and the connecting rivets are not arranged in the thin-walled main section, but in parts reinforced by connecting pieces provided inside or outside. This is highly important with regard to the reliability of the riveting, since in order to obtain constructions of the very lowest weight—no matter whether light metal or high class steel be used as material—often very thin-walled plates and sections are employed, in which the friction caused by pressure plays a great role.

Figure 18:
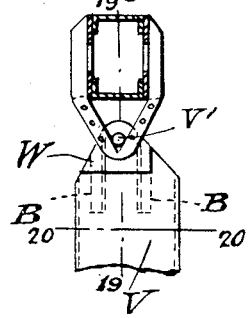
Figs. 18–20 are cross-sectional and longitudinal sectional views of a dismountable connection of a flying machine boom.
Figure 19:
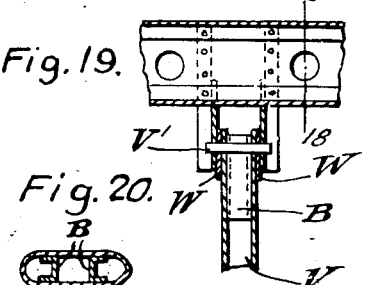
Figure 20:
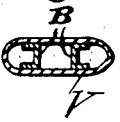

In the joint according to Figs. 18-20 the end of a flying machine boom is flattened in the middle and possesses U-shaped inner connecting pieces B with flanges pointing outwards and riveted on to the flat sides of the boom. The U-sections B transmit the force from the sectional bar to a hinge bolt, for which they serve at the same time as spacers. The flying machine boom is connected flexibly with a beam by means of the hinge bolt VI and two eyes W. As the hinge bolt is arranged transversally to the centre of symmetry of the boom, a buckling of the bar in the direction of the smallest moment of inertia is prevented. Though the connection is easily to be dismounted, a sufficient fixing is obtained. Similar to the modification in Fig. 1 those ends of the section mantle which are not used for transmitting force to the U-shaped inserted piece, are cut out or cut off slantingly. Hereby the riveting is simplified as well as the flexibility is increased without weakening the connection.

The connections according to the modifications described above, which can be employed in airship, and in other mast and frame work constructions for light structures, prove the great profit derived from the invention without exhausting all possibilities for applying them. For in all cases, in which closed and therefore not easily connectible hollow bars are to be united with one another or with other parts of the construction, according to the invention the greatest accessibility can be obtained by individually shaping the bar ends. Therefore just the hollow bar shapes characteristic for light structures, which ensure the best utilization of the material, can be used without almost any exception even for constructing complicated joints, since to the smallest sections and to material as thin as paper the riveting tools can be applied and riveting can be reliably effected as far as the pressure or friction is concerned. As a consequence of the possibility of making complicated connections reliably even with comparatively small bar sections by this invention new applications are opened to the light structure such as light frames for radiotelegraphic purposes.

I do not want to be limited to the details described or shown in the drawings, as many variations will occur to those skilled in the art.

I claim:

1. A light weight metal structure of the type described comprising a stress transmitting member, said member constituting a thin walled tube, the walls at one end portion of the tube being cut out to form two oppositely disposed spaced end portions, and a plurality of channel shaped connecting members, the channel shaped members having fastening means connecting them to the oppositely disposed spaced end portions, said fastening means being accessible through the cut out walls of the end portion of the tube to facilitate fastening the members together.

2. A light weight metal structure of the type described, comprising a stress transmitting members, said member constituting a thin walled tube, the walls at one end portion of the tube being cut out to form two oppositely disposed spaced end portions, and a plurality of channel shaped connecting members inserted into the cut out end portion, the flanges of the channel shaped members having means connecting them to the oppositely disposed spaced end portions, said means being accessible through the cut out walls of the end portion of the tube to facilitate fastening the elements together.

3. A light weight metal structure of the type described, comprising a stress transmitting member, said member constituting a thin walled tube, the walls at one end portion of the tube being cut out to form two oppositely disposed spaced end portions, and a substantially channel shaped connecting member inserted into the cut out end portion, the web of the channel member constituting a transverse connection between the spaced end portions, the flanges of the channel shaped member having rivets connecting them to the oppositely disposed spaced end portions, said rivets being accessible through the cut out walls of the end portion of the tube.

In testimony whereof I affix my signature.

KARL ARNSTEIN.